United States Patent [19]
Cohen

[11] Patent Number: 5,964,593
[45] Date of Patent: Oct. 12, 1999

[54] DEVELOPMENTAL LANGUAGE SYSTEM FOR INFANTS

[76] Inventor: Hannah R. Cohen, 10010 Walsham Ct., Richmond, Va. 23233

[21] Appl. No.: 09/104,846

[22] Filed: Jun. 25, 1998

Related U.S. Application Data

[62] Division of application No. 08/808,107, Feb. 28, 1997, Pat. No. 5,893,720, which is a continuation of application No. 60/014,062, Mar. 25, 1996.

[51] Int. Cl.$^6$ .......................... G09B 19/00; G09B 19/04; G09B 5/00
[52] U.S. Cl. .......................... 434/156; 434/185; 434/236; 434/307 R; 434/308; 704/270
[58] Field of Search ..................... 434/156, 169, 434/170, 185, 236, 307 R, 308, 309, 310, 319, 320, 321, 322, 323, 324, 327, 331, 332, 362; 704/270, 271, 272, 275, 276

[56] References Cited

U.S. PATENT DOCUMENTS

| | | | |
|---|---|---|---|
| 4,464,119 | 8/1984 | Vildgrube et al. | 434/185 |
| 5,260,869 | 11/1993 | Ferrier et al. | 600/595 |
| 5,358,259 | 10/1994 | Best | 463/31 |
| 5,428,998 | 7/1995 | Downs | 73/585 |
| 5,478,240 | 12/1995 | Cogliano | 434/327 |

*Primary Examiner*—Robert A. Hafer
*Assistant Examiner*—John Edmund Rovnak

[57] ABSTRACT

A computer toy for infants that promotes normal speech development by facilitating the infant's experimentation with babbles and other elementary sounds. Additionally, the toy provides an enriched environment for language learning by prompting the infant with a repertoire of verbal sounds including phonemes, syllables, and simple spoken words. The toy includes a microphone input device for detecting vocalizations by an infant and an audiovisual output device for providing feedback to the infant including the immediate playback of the infant's own vocalizations, and a control means for transforming detected vocalizations into instructions for use by the audiovisual output device.

13 Claims, 4 Drawing Sheets

DEVELOPMENTAL LANGUAGE SYSTEM FOR INFANTS

This application is a divisional of application Ser. No. 08/808,107 filed Feb. 28, 1997, now U.S. Pat. No. 5,893,720, which is a continuation of provisional application Ser. No. 60/014,062 filed Mar. 25, 1996.

BACKGROUND OF THE INVENTION

I. Field of the Invention

This invention relates to interactive video games and toys for infants, and in particular to a unique educational computer toy that provides an enriched environment for language learning while simultaneously facilitating the attentional skills of an infant.

II. Description of Related Art

The world of a newborn is a tangle of strange new sights and sounds which the infant must sort through and organize into an orderly arrangement of information. This process occurs during the normal course of the baby's development as she explores her environment and tests the world around her. These early interactions between the infant and her surroundings encourage neural growth and stimulate mental development. Toys are universally used to promote this developmental process, and the ability of infants to learn by playing with properly designed toys is widely recognized.

Traditional toys for this age group have included mobiles, rattles, squeeze toys and the like. However, with the advent of the computer age, sophisticated electronic toys for infants have been added to the list. The technology employed by these new toys allows for more improved methods of encouraging learning. In addition, many of the newer toys are designed to stimulate and promote specific developmental skills such as gross motor skills, eye-hand coordination, vision, and other fundamental skills. In particular, some new toys have been specially designed to foster vocalization, speech, and verbal communication.

As infants develop their vocalization and verbal skills, they typically progress through an identifiable sequence of developmental stages characterized by babbles of increasing complexity. Such babbling is a form of exploration by the infant and appears to be a necessary step in the normal process of phonological development.

During an infant's progression through the various stages of babbling, feedback plays a crucial role in the development of a vocalic repertoire. Parents reinforce this development by responding to the infant's communicative initiatives. Moreover, the process is reinforced each time the infant hears the sound of her own voice. Repeated reinforcement is vital because proper speech development requires the infant to master the vocalization of many different phonemes in a multitude of combinations. Computer toys offer several advantages in this respect. They can be designed to provide vocal stimulation and reinforcement as often as necessary and in a manner that can hold the attention of a newborn.

U.S. Pat. No. 5,478,240 discloses an electronic toy for teaching a child language skills by utilizing a keyboard which is associated with the toy. But, because use of this toy requires keyboard skills, it is not appropriate for an infant.

U.S. Pat. No. 5,358,259 discloses a talking video game that provides simulated voice dialog between human players and animated characters on a TV screen. Because this game is geared to a child who already has some basic language skills, it is also not appropriate for an infant.

U.S. Pat. No. 5,260,869 discloses a system that promotes normal auditory development in an infant by facilitating the infant's exploration of a developmental sequence of sounds and a repertoire of simple spoken words. This system, while appropriate for an infant, can only reinforce the infant's vocalization by the playback of prerecorded sounds and visuals in response to the activation of pressure micro switches.

In spite of these and other previously known toys that stimulate language development, it would be desirable to have an improved toy that monitors an infant's babbling and instantly plays back the infant's babbling thus allowing the infant to hear the sound of her own voice repeated immediately after each vocalized babble. This monitoring and playing back of vocalizations creates an enriched environment for language learning and provides important reinforcement that makes the present invention a useful language development tool.

BRIEF SUMMARY OF THE INVENTION

I. Nature and Substance of the Invention

It is certainly desirable to extend the existing repertoire of toys for children toys to include improved computer toys specifically designed to stimulate speech development by providing immediate reinforcement of vocalization by mimicking and repeating the infant's own vocal sounds at the times they occur.

The present invention is a computer toy that monitors an infant's babbling and instantly plays back the infant's babbling allowing the infant to hear the sound of her own voice repeated immediately after each vocalized babble. Moreover, in the toy of the present invention, the infant is not required to utilize motor skills to interact with the toy of the present invention. In fact, an infant's normal form of exploration via babbling is sufficient to actuate the input device of this toy and allow meaningful interaction between the baby and the toy.

By playing with the toy of the present invention, a baby is not only motivated to improve her vocalization skills, but also learns to interact via speech. In addition, she will also develop the concept that an action brings about a consequence, and will be encouraged in continuing her explorations of cause and effect relationships. Furthermore, because the toy of this invention totally involves the baby as an active participant in a interactive activity, the baby is not relegated to a passive role which often leads to frustration and loss of interest.

The computer implemented process of the present invention comprises the steps of presenting an infant with a vocal sound selected at random from a dictionary of a phonemes, syllables, words, or phrases, playing the selected sound to familiarize the infant with that sound, listening for vocalization by the infant, and echoing back any vocalization of the infant that is detected.

The computer implemented process of the present invention may also comprise the additional steps of displaying an interesting visual as a reinforcement whenever a vocalization by the infant is detected.

The computer implemented process of the present invention may also comprise the additional steps of presenting an infant with musical sounds selected at random from a dictionary of musical notes, chords, or simple melodies, and playing the selected musical sound to familiarize the infant with that musical sound.

The apparatus of the present invention comprises a means for presenting an infant with a vocal sound selected at random from a dictionary of a phonemes, syllables, words, or phrases, a means for playing the selected sound to familiarize the infant with that sound, a means for listening for vocalization by the infant, and a means for echoing back any vocalization of the infant that is detected.

The apparatus of the present invention may also comprise a means for displaying an interesting visual as a reinforcement whenever a vocalization by the infant is detected.

The apparatus of the present invention may also comprise a means for presenting an infant with musical sounds selected at random from a dictionary of musical notes, chords, or simple melodies, and a means for playing the selected musical sound to familiarize the infant with that musical sound.

The toy of the present invention serves as both an educational aid and an amusement device. It can promote normal development by facilitating an infant's experimentation with babbling sounds. By providing a repertoire of simple spoken words, it can be used to help infants develop their communication skills. It can also help an infant understand cause and effect relationships thereby promoting normal cognitive development.

II. Objects of the Invention

It is an object of the present invention to provide a computer toy that provides an enriched environment for language learning.

Another object of the present invention is to provide a computer toy which will expose an infant to the verbal and musical sounds of different countries and cultures.

Another object of the present invention is to provide a computer toy which will encourage and promote vocalization by an infant.

Another object of the present invention is to provide a computer toy which will reinforce the vocalization of an infant by mimicking and repeating the infant's own vocal sounds.

Yet another object of the present invention to provide a computer toy which uses sound recognition technology to allow an infant to easily play and interact with the toy.

Still a further object of the present invention is to provide a computer toy that will fascinate and hold the interest of an infant for an extended length of time thereby facilitating the attentional skills of an infant.

Additional objects and advantages of the invention are set forth in the drawings, description, and claims which follow. Some objects and advantages will be obvious from the instrumentalities and combinations particularly pointed out while other objects and advantages may be learned by the practice of the invention.

BRIEF DESCRIPTION OF THE DRAWINGS

The following drawings, which are incorporated in and constitute a part of the specification, serve to explain the principles of the present invention when they are taken together with the general description given above and the detailed description of the preferred embodiments given below. Moreover, the aforementioned objects and advantages of the present invention, as well as additional objects and advantages thereof, will become apparent when consideration is given to the following detailed description which should be read in conjunction with the following drawings wherein.

DETAILED DESCRIPTION OF THE INVENTION

The present invention is a computer toy meant to be played with by an infant in the care and presence of her parent. This computer toy may require the use of a computer (or processor), a display screen, and an input device or may be self contained with a specially designed processor, screen display, and input device being part of the toy itself. To provide a complete and thorough understanding, this specification sets forth many different but specific embodiments and configurations as illustrative of the present invention with well known systems shown in diagrammatic form. Nevertheless, the present invention may be practiced by application of numerous modifications obvious to those skilled in the art without making use of the specific details shown and described.

Preferably, as a computer implemented process, the computer toy of the present invention will be disposed within a floppy disk, an optical compact disk, or an electronic cartridge. When transferred to the computer being utilized, the present invention allows the processor to display entertaining audiovisual sequences, to monitor for vocalizations by an infant, to digitally record and play back any detected vocalizations, and to display colorful attention getting visuals at the same time as any detected vocalizations are played back.

Figure 1:
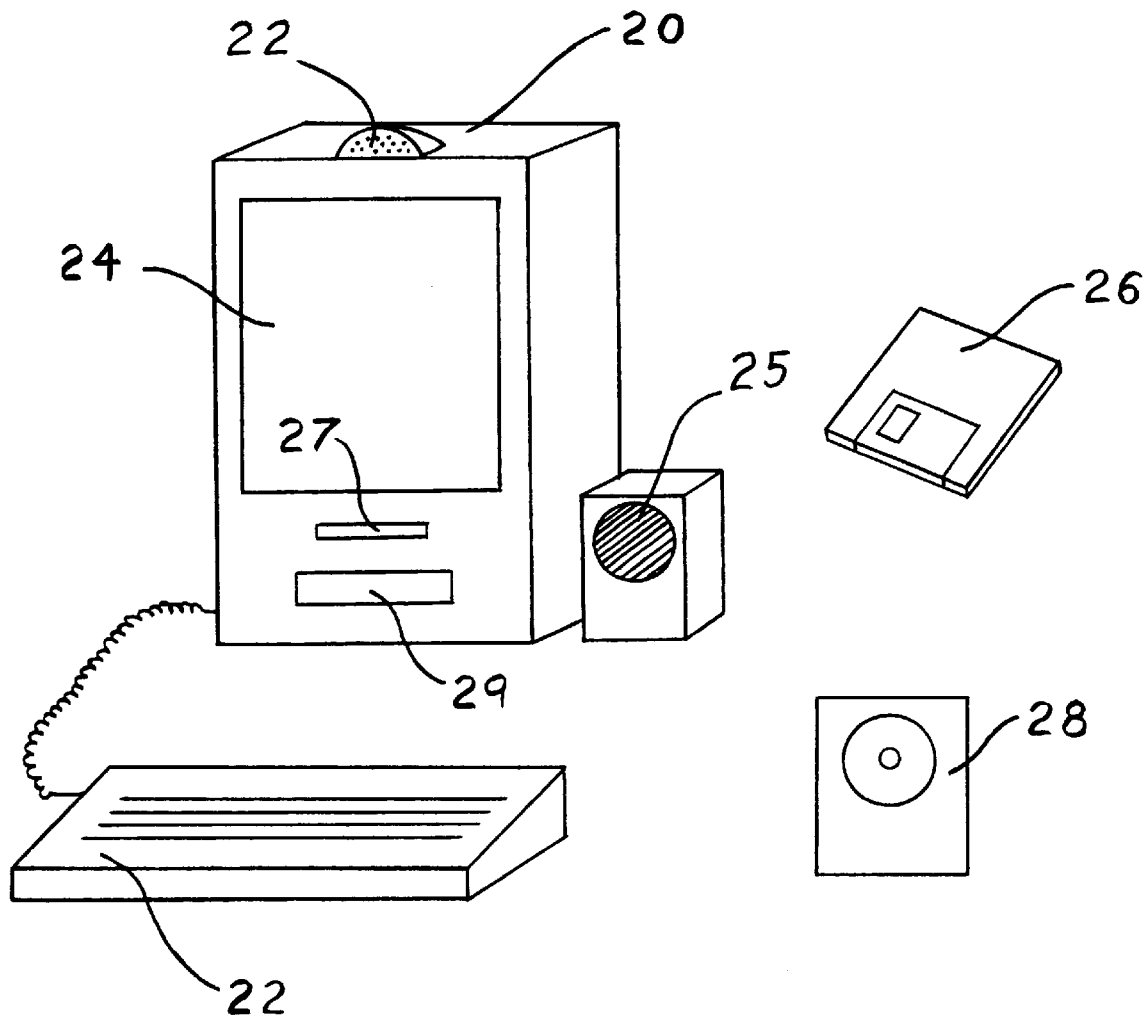
FIG. 1 is a pictorial view of the physical arrangement of the toy of the present invention utilizing a general purpose personal computer.

The computer may be a general purpose personal computer as shown in FIG. 1. Here we see illustrated a physical arrangement in which the present invention utilizes a personal computer 20, a built-in microphone 22, an audio speaker 25, and a display screen 24. The computer implemented process of the present invention is transferred to the personal computer 20 by inserting a floppy disk 26 or optical compact disk 28, within which the computer implemented process is embodied, into the diskette drive 27 or optical compact disk drive 29. The computer toy is then activated by issuing a suitable command to the computer's operating system.

Figure 2:
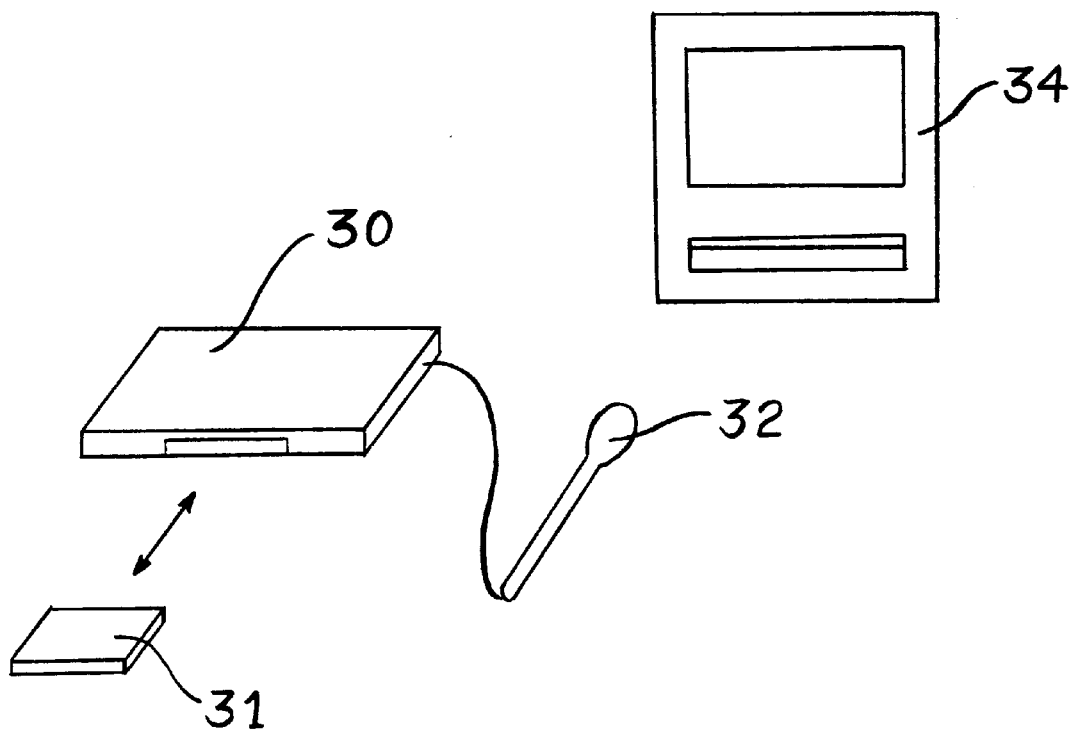
FIG. 2 is a pictorial view of the physical arrangement of the toy of the present invention utilizing a special purpose game system.

Referring now to FIG. 2, there is shown an alternate physical arrangement with the toy of this invention utilizing a special-purpose game system 30 such as the "Nintendo" brand system or the "Sega" brand system, which are designed to operate games and use a standard television set as a display 34. FIG. 2 also illustrates a handheld microphone 32 and an electronic cartridge 31 (within which this embodiment of the present invention is embodied) which is compatible with the special-purpose game system.

The present invention may also be manufactured as a self contained computer toy comprising the computer, input device, and display screen as a single unit.

Figure 3:
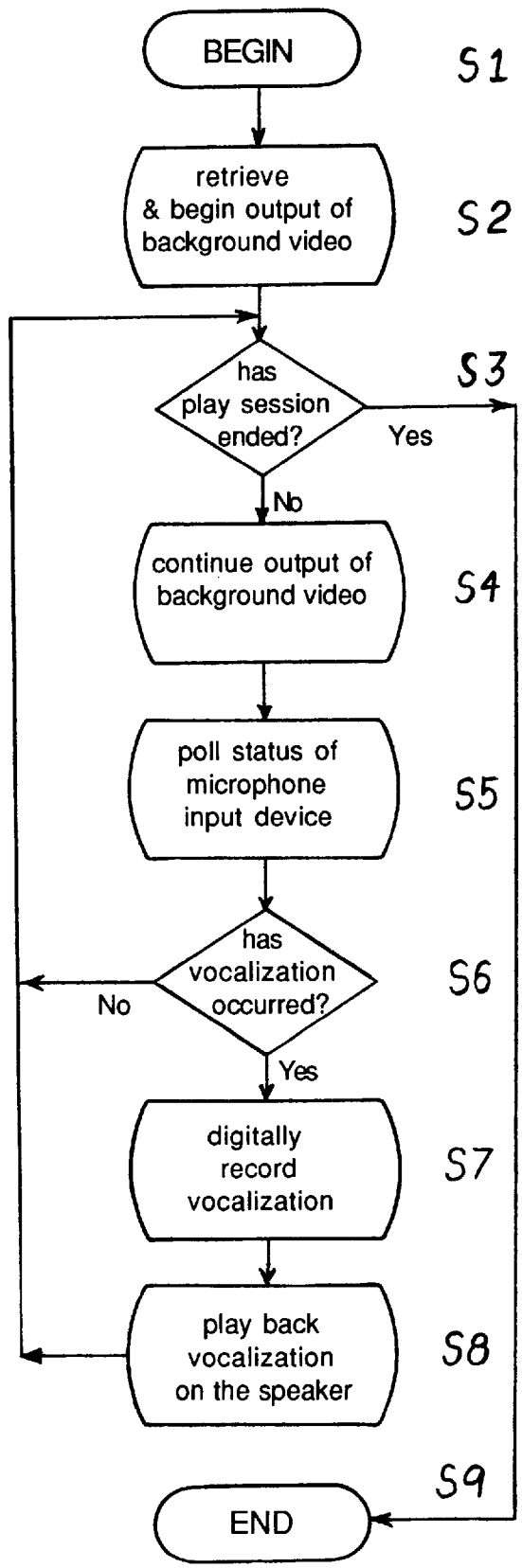
FIG. 3 is a flow diagram of the operation of one embodiment of the present invention.

With regard to all of the above embodiments, FIG. 3 is a flow chart for explaining a possible order of operations that may be executed by a computer processor to implement a typical play session during which an infant, in the company of a parent, plays with the present invention. In this flow chart, the play session is initiated (by the infant's parent) at step S1. Immediately thereafter, video data corresponding to a visually entertaining background video is retrieved from a floppy disk, CD ROM, or other storage medium and loaded into the computer's random access memory after which output to the display screen is begun (step S2). Next, the computer processor tests to see whether or not the parent has terminated the play session (step S3). If the parent chose to terminate the play session, the flow proceeds to step S9 wherein the play session is ended. Otherwise, the flow proceeds to step S4 where the computer processor continues to output the background video to the display screen. Next, while the background video continues to play, the processor polls the status data of a microphone input device (step S5). In step S6 the processor tests the microphone status data to determine if a vocalization has occurred. If there was a vocalization (sufficient to cause the microphone input device to generate an input signal), the flow proceeds to step S7 where the vocalization is digitally recorded. Otherwise the flow will return to step S3 and the processor will again test to see if the play session is ended. Once a vocalization has been detected and recorded, it is played back over a speaker output device (step S8). After each vocalization that has been detected, recorded, and played back, the flow returns to step S3 where the processor once again tests to determine if the play session has been terminated.

In an alternative embodiment, the computer implemented process of this invention may include the additional steps of temporarily interrupting the background video whenever a vocalization is detected and presenting a short attention-getting video as a reward stimulus at the same time as the digitally recorded vocalization is played back.

In another alternative embodiment, the infant may be prompted to vocalize by the inclusion of process steps wherein prerecorded vocal sounds selected at random from a dictionary of a phonemes, syllables, words, or phrases are played over a speaker output device at random times during the presentation of the background video. Such prompts will also familiarize the infant with those sounds that are critical to the development of a meaningful vocalic repertoire.

In still another embodiment, the infant may be stimulated by the inclusion of process steps wherein prerecorded musical sounds selected at random from a dictionary of musical notes, chords, or simple melodies are played over a speaker output device at random times during the presentation of the background video. Such stimulation appears to be important in the development of spatial reasoning and higher order thinking.

In yet another embodiment, the invention may include the step of providing the infant's parent with a menu of languages and cultures from which she may choose for a particular play session. In this case, the parent has the opportunity to expose her child to the vocal and musical sounds of different countries and cultures. Exposure at an early age, to the sounds and words of another language, plays a vital role in preparing a child to be able to speak that language in a fluent manner without an accent.

In all of the above cases, the operation of the present invention includes a listening mode wherein babbling or other vocalizations may be detected. This listening mode lasts throughout each play session or at least during certain periods of time within each play session. To promote speech development in an infant, each vocalization detected during the listening mode is digitally recorded and played back to the infant. This well defined and consistent consequence of vocalization provides the motivation for additional vocalizations. Moreover, the presentation of digitally recorded babbles, words, and phrases, in accordance with the infant's developmental stage, serves to further stimulate speech development.

Additionally, the presentation of other pleasing sound effects and visual displays provides amusement and entertainment as well as an enjoyable way for the infant to experience cause and effect relationships.

Figure 4:
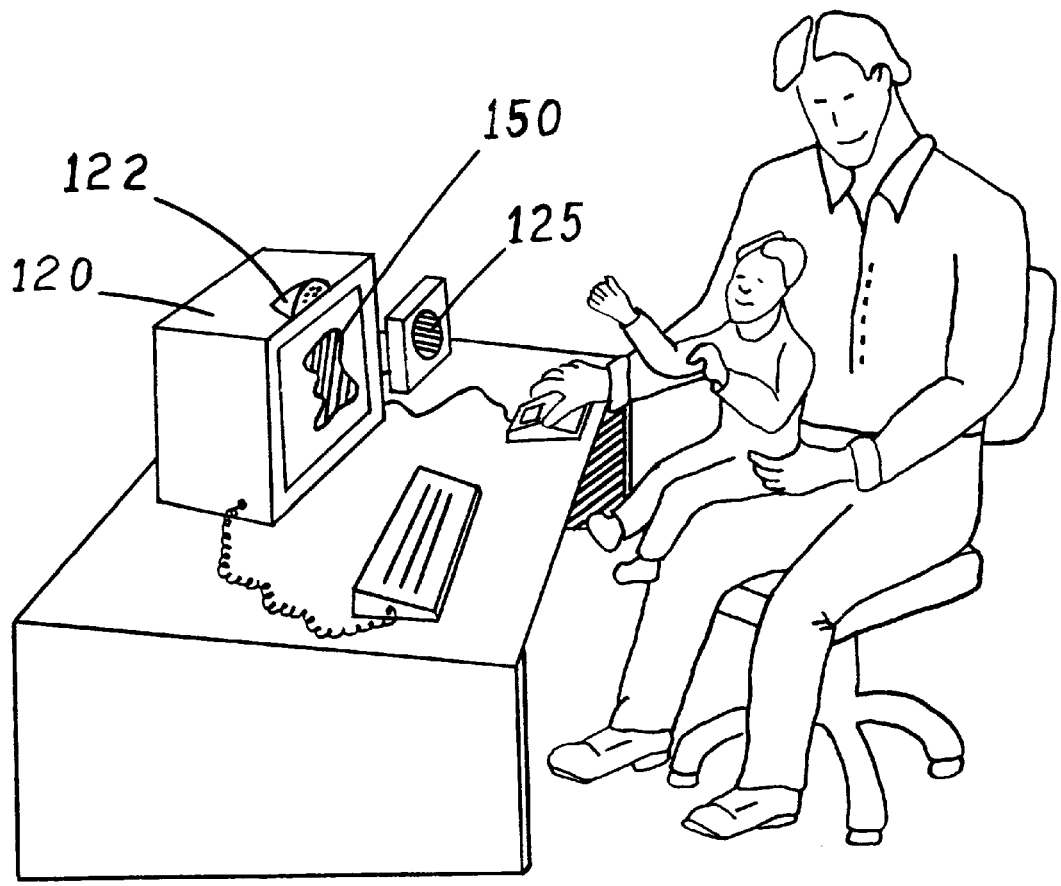
FIG. 4 is a perspective view of a baby, seated in the lap of an adult, being amused by the visual displays presented on the display screen of a computer during a play session.

Referring now to FIG. 4, we see an infant, seated on the lap of an adult, playing with one embodiment of the computer toy of the present invention. During the play session an entertaining background video is usually displayed on the display screen. As the infant babbles and gurgles, the computer 120 monitors these vocalizations via the microphone input device 122, digitizes them, and plays them back via the speaker system 125 of the computer thereby stimulating and rewarding the infant for her communicative initiatives. Simultaneous with the playback of the digitized vocalization, the background video is interrupted so that a further visual stimulus 150 may be presented on the display screen. The more often the infant babbles or otherwise vocalizes, the more often she is stimulated by the sound of her own voice and rewarded with attention-getting visuals.

Because the computer toy of this invention does all the prompting automatically it is particularly suited to infants. The infants are not required to react to any commands or visuals on the display screen. Complex learned skills do not come into play and facile hand movements are not required. In fact, only the vocalizations associated with normal speech development are necessary to actuate an input device such as a microphone thereby allowing infants to easily interact with the computer during a play session.

Because of all of these factors, an infant playing with the computer toy of the present invention will maintain interest, learn about cause and effect, and improve her ability to vocalize. The present invention permits an infant to interact with a computer and develop her vocalic repertoire more easily than has previously been possible. Thus, an improved computer toy has been disclosed.

Regarding the above description, it should be realized that other modifications and changes varied to fit particular operating requirements and environments will be apparent to those skilled in the art. Therefore, the invention is not considered limited to the examples chosen for purposes of disclosure, and covers all changes and modifications which do not constitute departures from the true spirit and scope of this invention. Accordingly, all suitable modifications and equivalents are intended to be encompassed by the present invention, the scope of which is indicated by the appended claims.

Having thus described the invention, what is claimed as being new and desired to be protected by Letters Patent of the United States is as follows:

1. A computer implemented process for promoting normal speech development in an infant, utilizing a computer with audio input and output devices, and a display screen, the process comprising:

(a) presenting a background video on the display screen, whereby the infant is amused;

(b) detecting a vocalization of the infant that occurs during the time that the background video is being presented, said vocalization being detected by use of the audio input device;

(c) promptly digitizing the detected vocalization while the background video continues to be presented;

(d) promptly playing back the digitized vocalization after such vocalization is detected and digitized, such playback occurring via the audio output device without necessarily interupting the background video which is being presented;

(e) repeating steps (a), (b), (c), and (d), whereby the development of normal speech is facilitated.

2. A computer implemented process for promoting normal speech development in an infant according to claim 1, further comprising the step of interrupting the background video whenever a vocalization is detected and presenting a short attention-getting video as a reward stimulus at the same time as the digitally recorded vocalization is played back.

3. A computer implemented process for promoting normal speech development in an infant according to claim 1, further comprising the step of stimulating the infant to vocalize by occasionally playing vocal sounds on the audio output device during the time that the background video is being presented.

4. A computer implemented process for promoting normal speech development in an infant according to claim 2, further comprising the step of stimulating the infant to vocalize by occasionally playing vocal sounds on the audio output device during the time that the background video is being presented.

5. A computer implemented process for promoting normal speech development in an infant according to claim 1, further comprising the step of stimulating the infant by occasionally playing musical sounds on the audio output device during the time that the background video is being presented.

6. A computer implemented process for promoting normal speech development in an infant according to claim 2, further comprising the step of stimulating the infant by occasionally playing musical sounds on the audio output device during the time that the background video is being presented.

7. A computer implemented process for promoting normal speech development in an infant according to claim 3, further comprising the step of stimulating the infant by occasionally playing musical sounds on the audio output device during the time that the background video is being presented.

8. A computer implemented process for promoting normal speech development in an infant according to claim 4, further comprising the step of stimulating the infant by occasionally playing musical sounds on the audio output device during the time that the background video is being presented.

9. A computer toy for an infant, utilizing a computer with an audio input, an audio output, and a display screen, the object of which toy is to facilitate normal speech development, the computer toy comprising:
  (a) a video means for playing an entertaining background video on the display screen;
  (b) a detection means for detecting input signals which are generated and sent to the computer by the audio input whenever the input device is activated by a vocalization;
  (c) a digitizing means for digitally recording any detected vocalization;
  (d) an audio means for playing said digitally recorded vocalization on the audio output; and
  (e) a control means for enabling the video means to play the background video on the display screen, and ensure that whenever an input signal is detected by said detection means, said digitizing means will digitize the detected vocalization and said audio means will play said digitally recorded vocalization on the audio output, whereby the infant is promptly rewarded with the sound of her own voice every time she vocalizes.

10. A computer toy according to claim 9, further comprising a floppy disk compatible with the computer to be utilized, wherein said video means, detection means, digitizing means, audio means, and control means are disposed within the magnetic media of said floppy disk.

11. A computer toy according to claim 9, further comprising an optical compact disk compatible with the computer to be utilized, wherein said video means, detection means, digitizing means, audio means, and control means are disposed within said optical compact disk.

12. A computer toy according to claim 9, further comprising an electronic cartridge compatible with the computer to be utilized, wherein said video means, detection means, digitizing means, audio means, and control means are disposed within said electronic cartridge.

13. A computer toy according to claim 9, further comprising the computer, audio input, audio output, and display screen that said computer toy utilizes, whereby said computer toy is self contained.

\* \* \* \* \*